United States Patent

Eyhorn et al.

[11] Patent Number: 5,911,903
[45] Date of Patent: Jun. 15, 1999

[54] MIXTURE AND PROCESS FOR PRODUCING HEAT-INSULATING MOLDINGS

[75] Inventors: Thomas Eyhorn, Altusried; Günter Kratel, Durach; Andreas Rell, Waltenhofen, all of Germany

[73] Assignee: Wacker-Chemie GmbH, Munich, Germany

[21] Appl. No.: 08/847,438

[22] Filed: Apr. 28, 1997

[30] Foreign Application Priority Data

May 10, 1996 [DE] Germany ............... 196 18 968

[51] Int. Cl.$^6$ ...................................... E04B 1/74
[52] U.S. Cl. ................ 252/62; 501/81; 501/82; 501/83
[58] Field of Search ............... 252/62; 501/80, 501/81, 82, 83

[56] References Cited

U.S. PATENT DOCUMENTS

| 4,394,337 | 7/1983 | Kummermehr | 264/347 |
| 4,900,698 | 2/1990 | Lundsager | 501/81 |
| 4,985,163 | 1/1991 | Kratel et al. | 252/62 |
| 5,556,689 | 9/1996 | Kratel et al. | |

FOREIGN PATENT DOCUMENTS

| 0032776 | 7/1987 | European Pat. Off. . |
| 0618399 | 10/1994 | European Pat. Off. . |
| 0623567 | 11/1994 | European Pat. Off. . |
| 2942087 | 4/1987 | Germany . |
| 0041912 | 3/1979 | Japan . |

*Primary Examiner*—Paul Marcantoni
*Attorney, Agent, or Firm*—Brooks & Kushman P.C.

[57] ABSTRACT

The invention relates to a mixture for producing a heat-insulating molding, comprising from 20% to 99% by weight of microporous, oxidic inorganic material, from 0% to 50% by weight of opacifier, from 0% to 50% by weight of fiber material and from 0% to 15% by weight of inorganic binding material, and from 1% to 20% of a combustible component which on heat treatment burns with virtually no residue leaving behind pores in the finished molding. The invention also relates to a process for producing the molding.

7 Claims, No Drawings

MIXTURE AND PROCESS FOR PRODUCING HEAT-INSULATING MOLDINGS

BACKGROUND OF THE INVENTION

The present invention relates to a mixture comprising microporous, oxidic inorganic material with or without opacifier, fiber material and inorganic binding material, which is compression-molded to a heat-insulating molding.

Heat insulating moldings are known and described, for example, in U.S. Pat. No. 4,985,163. They comprise microporous, oxidic inorganic material, for example, pyrogenic silicas, including arc silicas, precipitated silicas or silicon dioxide aerogels and aluminas prepared analogously. To achieve good heat insulation properties the material has high specific surface areas which are in the range of 50–700 m²/g. Because of the large surface areas, the adsorption capacity for polar substances is highly pronounced so that in a natural atmosphere the material eagerly takes up water. Similar properties are exhibited by the heat-insulating moldings produced which absorbs moisture in storage and use. If a molding of this kind is subjected within a short period to high thermal energy, there is an explosive production of water vapor, which destroys the structure of the molding. This effect occurs, for example, with heat-insulating moldings used as thermal insulators in radiant heaters for ceramic hobs, which heaters are typically brought to incandescence in from 1 to 5 seconds.

There is a need to provide for an increase in the gas permeability of such moldings, especially for an increase in the diffusion of water vapor from the interior to the surface of the molding and to avoid the occurrence of excess pressure in the interior of the molding, which would destroy its structure.

In accordance with EP 618 399 A1, a tool is used to drive channel pores mechanically into the surface of the molding. However, this method causes problems, especially when the surface of the molding is not smooth but structured and possesses, grooves, rifts or other bulges. It is difficult to avoid instances of breakoff or flakeoff of material when the channel pores are being made, in the base of the grooves or at the edge of the grooves, thereby rendering the molding unusable for the intended application.

BRIEF SUMMARY OF THE INVENTION

The object of the present invention is for a simple alternative which leads to a heat-insulating molding which can be subjected to heat shock without being destroyed.

DETAILED DESCRIPTION OF THE INVENTION

The present invention provides a mixture comprising:

| | |
|---|---|
| 20% to 99% by weight | of microporous, oxidic inorganic material, |
| 0% to 50% by weight | of opacifier, |
| 0% to 50% by weight | of fiber material and |
| 0% to 15% by weight | of inorganic binding material, | and a combustible component which on heat treatment burns with virtually no residue to leave behind pores where the percent by weight amounts are based on the total weight of the mixture. The invention also provides a process for producing a heat-insulating molding from this mixture.

A molding produced from the mixture retains its structure when subjected to heat shock even after extreme uptake of water, without any reduction in its heat insulation properties.

In comparison, with moldings in accordance with the above mentioned EP 618 399 A1, the production of moldings does away with the laborious provision of channel pores and the associated risk of reduced outputs.

The mixture used to produce the molding has the following composition:

| | |
|---|---|
| 20%–99% by weight | of microporous, oxidic inorganic material |
| 0%–50% by weight | of opacifier |
| 0%–50% by weight | of fiber material |
| 0%–15% by weight | of inorganic binding material |
| 1%–20% by weight | of a combustible component. |

A preferred composition is:

| | |
|---|---|
| 30%–89% by weight | of microporous, oxidic inorganic material |
| 8%–50% by weight | of opacifier |
| 1%–20% by weight | of fiber material |
| 0%–5% by weight | of inorganic binding material |
| 2%–12% by weight | of a combustible component. |

Particularly good results are obtained with the following compositions:

| | |
|---|---|
| 30%–74% by weight | of microporous, oxidic inorganic material |
| 20%–40% by weight | of opacifier |
| 2%–10% by weight | of fiber material |
| 0%–3% by weight | of inorganic binding material |
| 4%–10% by weight | of a combustible component. |

The combustible component of the mixture is required to burn virtually without residue in the course of a heat treatment which is necessary to produce a heat-insulating molding. It is selected from a group of substances embracing wood, paper, cellulose, starch, waxes, proteins, combustible plastics and any desired mixture of individual substances or combinations thereof. The combustible component makes up from 1% to 15% of the volume of the mixture, the size (maximum lengthwise extent) of the particles of the combustible component being in the range from 0.1 to 3 mm. The particles are preferably fibrous or particulate, and mixtures of fibrous and particulate particles. The heat-insulating molding has pores corresponding to a proportion of from 1% to 15% of the overall volume of the molding, which are distributed uniformly and with no preferential direction.

As microporous, oxidic inorganic material it is preferred to use a substance selected from a group embracing finely divided, pyrogenic silicas, including arc silicas, low-alkali precipitated silicas, silicon dioxide aerogels, aluminas produced analogously, and mixtures of individuals or combinations of these substances. Preference is given to the use of pyrogenic silica, alumina or mixtures thereof. The finely divided material has a BET specific surface area of 50–700 m²/g, preferably 70–400 m²/g.

Examples of opacifiers are ilmenite, titanium dioxide, silicon carbide, iron(II)/iron(III) mixed oxide, chromium dioxide, zirconium oxide, manganese dioxide, iron oxide, silicon dioxide, alumina and zirconium silicate, and mixtures thereof. It is preferred to use ilmenite and zirconium silicate. The opacifiers have an absorption maximum in the infrared range between 1.5 and 10 μm.

Examples of fiber materials are glass wool, rock wool, basalt wool, slag wool and fibers as obtained from melts (for example by blowing, spinning or drawing) containing alumina and/or silicon dioxide, examples being quartz glass fibers, ceramic fibers, fibers with an SiO₂ content of at least 96% by weight, and glass fibers, such as E glass fibers and R glass fibers, and mixtures of one or more of the above mentioned fiber types. Preference is given to quartz glass fibers, ceramic fibers and glass fibers which typically possess a diameter of from 0.1 to 15 µm and a length of from 1 to 25 mm.

As inorganic binding material, it is possible to use all binders whose use in heat-insulating moldings is known and which comprise microporous, oxidic inorganic material. Examples of such binders are disclosed in U.S. Pat. No. 4,985,163, referenced to above. Preference is given to the use of borides of aluminum, of titanium, of zirconium and of calcium, silicides, such as calcium silicide and calcium aluminum silicide, and especially boron carbide. Examples of other constituents are basic oxides, especially magnesium oxide, calcium oxide or barium oxide.

A heat-insulating molding produced in accordance with the present invention has the following physical parameters:

Density: 250–400 g/l

Flexural strength>0.1 N/mm$^2$

Compressive strength>0.5 N/mm$^2$

Thermal conductivity<0.030 W/mK

Electrical resistance>2000 MΩ

Preparation of the heat-insulating molding comprises the following process steps:

I. optional predensification of the mixture at pressures from 1 to 5 bar, especially 2 bar; compression-molding of the mixture into the desired form at final pressures of from 5 to 30 bar, the thickness of the resulting forms being from 10 to 35 mm, preferably from 10 to 15 mm;

II. heating of the compression molding at temperatures from 500° to 900° C. until the combustible component of the mixture has burnt virtually without residue to leave behind pores. This heat treatment is accompanied by curing of the molding.

Moldings produced are used as heat-insulating material in radiant heaters for heating hobs, especially glass ceramic hobs, and in heaters of ovens, especially baking ovens, where the radiated heaters may be configured as heated radiators (with a heated wire or heated strip as heat source), as halogen radiators (with a halogen lamp as heat source) or as a combination of heat radiators and halogen radiators.

COMPARISON EXAMPLE

A homogeneous mixture with the composition

| 58% by weight | of pyrogenic silica |
|---|---|
| 35% by weight | of titanium dioxide |
| 6% by weight | of ceramic fibers |
| 1% by weight | of boron carbide | was predensified, compressed to a molding 198 mm in diameter, 13 mm thick and with a density of 340 g/l, and subjected to heat treatment for 1 hour in a through-type oven at temperatures of up to 850° C. The molding obtained was stored for 40 hours in 93% relative atmospheric humidity at 30° C. The uptake of water was 11% by weight. The molding was subjected to heat shock for 45 seconds by means of a heating element, mounted over its surface, with a heat output of 1800 W. In the course of this treatment the molding ruptured in the interior, since the water vapor pressure produced could not be dissipated quickly enough.

EXAMPLE 1

A homogeneous mixture with the composition

| 54% by weight | of pyrogenic silica |
|---|---|
| 33% by weight | of titanium dioxide |
| 6% by weight | of ceramic fibers |
| 1% by weight | of boron carbide |
| 6% by weight | of wood fibers (trade name: Lignocel MK 300, manufacturer: Rettenmaier GmbH of Ellwangen, Germany) | was compressed to a molding as described in the comparison example and was heat-treated for 1.5 hours in a through-type oven at temperatures of up to 850° C. The resulting molding was subjected to a humid environment, as for the comparison example, and was then subjected to heat shock. In this experiment, the heat treatment did not cause any damage to the molding.

EXAMPLE 2

A homogeneously mixed heat-insulating mixture with the composition

| 56% by weight | of pyrogenic silica |
|---|---|
| 34% by weight | of titanium dioxide |
| 3% by weight | of glass fibers with diameters of 5 µm and an SiO$_2$ content of at least 96% by weight |
| 1% by weight | of boron carbide |
| 6% by weight | of cellulose (trade name: Lignocel F9, manufacturer: Rettenmaier GmbH of Ellwangen, Germany) | was treated as described in Example 1. The subjection of the molding produced to heat shock did not result in any destructive effect.

What is claimed is:

1. A mixture for producing a heat-insulating molding, comprising from 20% to 99% by weight of microporous, oxidic inorganic material, from 0% to 50% by weight of opacifier, from 0% to 50% by weight of fiber material, from 0% to 15% by weight of inorganic binding material, and from 1% to 20% of a combustible component which on heat treatment burns with substantially no residue leaving pores in the heat insulating molding, wherein said combustible component is supplied in the form of fibers, particles, or a mixture of fibers and particles having a size in the range of 0.1 mm to 3 mm.

2. The mixture as claimed in claim 1, wherein the proportion of the combustible component in the mixture is from 2% to 12% by weight.

3. A mixture as claimed in claim 1, wherein the combustible constituent is selected from the group consisting of wood, paper, cellulose, starch, waxes, proteins, combustible plastics and mixtures thereof.

4. A mixture as claimed in claim 1, wherein the microporous, oxidic inorganic material is selected from the group consisting of finely divided, pyrogenic silicas, aluminas, and mixtures thereof.

5. A mixture as claimed in claim 1, wherein the fiber material is selected from the group consisting of glass wool, rock wool, basalt wool, slag wool, quartz glass fibers, ceramic fibers and glass fibers, and mixtures thereof.

6. A process for producing a heat-insulating molding by compression molding and heat treating at a temperature of about 500° C. to about 900° C., a mixture comprising 20% to 99% by weight of microporous, oxidic inorganic material, from 0% to 50% by weight of opacifier, from 0% to 50% by weight of fiber material, from 0% to 15% by weight of inorganic binding material, and from 1% to 20% of a combustible component which in the course of the heat treatment burns with substantially no residue to leave behind pores, wherein said combustible component is supplied in the form of fibers, particles, or a mixture of fibers and particles having a size in the range of 0.1 mm to 3 mm.

7. The process as claimed in claim 6, wherein the pores created by the heat treatment comprise from 1% to 15% of the volume of the molding.

\* \* \* \* \*